W. H. F. SMITH.
FRICTION CLUTCH.
APPLICATION FILED JULY 22, 1915.
1,254,076.
Patented Jan. 22, 1918.
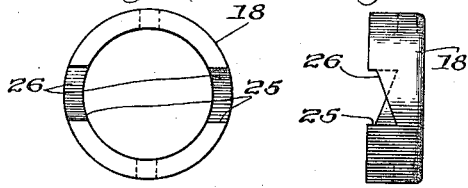
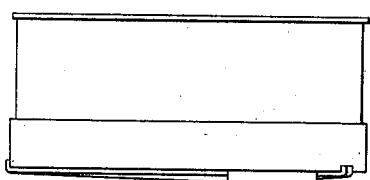
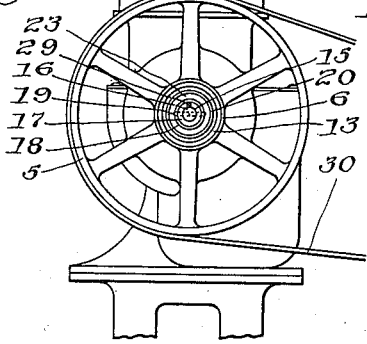
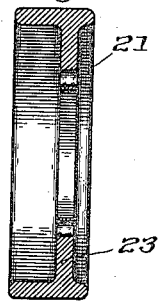
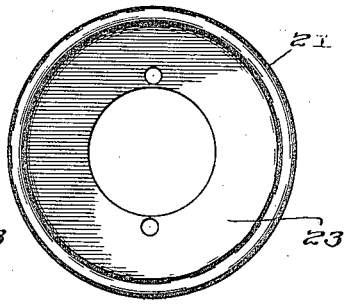
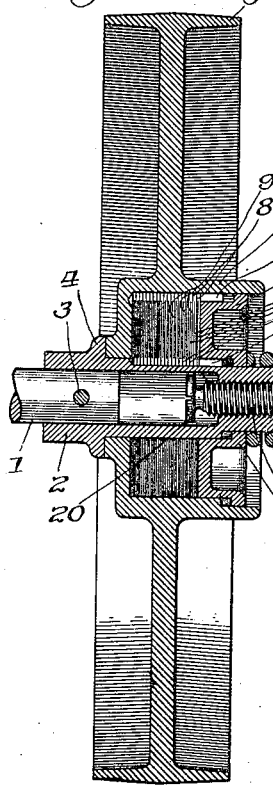
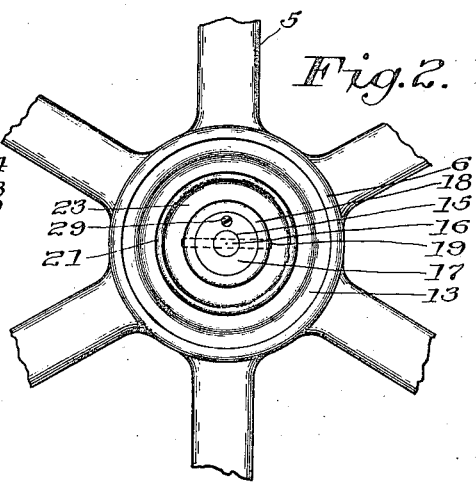
Inventor
William H.F. Smith,
By Chas. E. Lord
Atty.

UNITED STATES PATENT OFFICE.

WILLIAM H. F. SMITH, OF MILWAUKEE, WISCONSIN, ASSIGNOR TO INTERNATIONAL HARVESTER CORPORATION, A CORPORATION OF NEW JERSEY.

FRICTION-CLUTCH.

1,254,076.  Specification of Letters Patent.  Patented Jan. 22, 1918.

Application filed July 22, 1915.  Serial No. 41,253.

*To all whom it may concern:*

Be it known that I, WILLIAM H. F. SMITH, a citizen of the United States, residing at Milwaukee, in the county of Milwaukee and State of Wisconsin, have invented certain new and useful Improvements in Friction-Clutches, of which the following is a full, clear, and exact specification.

My invention relates to friction clutches of the multiple disk type, wherein a series of disks is used, the individual disks of one series alternating and opposing those of the other series, one of the series being operatively connected with a driving member in a manner to rotate therewith, and the remaining series with a driven member in a manner transmitting motion thereto, and including means for regulating the degree of frictional contact of the disks in a manner permitting the associated mechanism to carry its normal load at a regular speed.

One object of the invention is to improve the control whereby the degree of frictional contact of the disks may be increased temporarily, especially during the initial operation of starting to hold the excess of pressure upon the disks until full speed of the operative parts is attained in a well regulated and even manner without undue shocks or jerks.

Another object is to provide a simple friction drive mechanism especially adapted for use in connection with a cream separator.

These objects are attained by means of the mechanism illustrated in the accompanying drawings, in which—

Figure 1 is a vertical section of a driving pulley adapted to transmit motion to the operative parts of a machine as the driving shaft of a cream separator, by which it is carried and coupled therewith by means of my improved clutch mechanism;

Fig. 2 is a fragmentary side elevation of Fig. 1;

Fig. 3 is a plan view of a pressure regulating collar forming part of the pressure regulating means;

Fig. 4 is a side elevation of Fig. 3;

Fig. 5 is a plan view of a pressure controlling disk;

Fig. 6 is a vertical section of Fig. 5;

Fig. 7 is a side elevation of a detached pressure producing element forming part of the clutch mechanism;

Fig. 8 is an end elevation of Fig. 7; and

Fig. 9 is a side elevation of a cream separator having my improved clutch mechanism embodied in its construction.

Referring to the drawings, wherein the same reference characters designate like parts throughout the several views, 1 represents the driving shaft of a cream separator having a sleeve member 2 secured thereto by means of a pin 3, and provided with a bearing flange 4 at its inner end. A driving pulley 5 is journaled upon the sleeve and provided with a hollow cylindrical hub 6, having longitudinally disposed grooves 7 upon its inner wall that are adapted to receive radially extending lugs 8 upon the peripheries of a series of friction disks 9 that are opposed alternately by a second series of friction disks 10, having radially disposed lugs 11 extending inward from their axial openings and received by longitudinally disposed grooves 12 upon the periphery of the sleeve member 2, and 13 represents a master disk journaled upon the sleeve 2, with its periphery forming a bearing for the cylindrical hub 6 of the pulley 5, and its inner face engaging with the outside disk of the series. The sleeve member 2 extends beyond the hub member 14 of the master disk 13, and 15 represents a threaded pressure adjusting bolt received by a threaded axial bore through the extended end of the sleeve and provided with a reduced cylindrical portion 16 at its outside end, to which is secured a thimble 17 and a notched supplemental pressure regulating ring 18, by means of a pin 19, and 20 represents a slotted head upon the inside end of the bolt 15 whereby it may be adjusted longitudinally relative to the sleeve. 21 represents a pressure regulating hand wheel journaled upon the thimble 17 and carrying two laterally extending studs 22 secured to the web 23 of the wheel, the studs being provided with rounded outside ends 24 that are adapted to be received by radially disposed notches 25 in the inner face of the ring 18 and provided with inclined end walls 26 with which the inclined ends 24 of the studs are adapted to engage, the notches permitting a limited throw of the hand wheel 21 in opposite direction. 27 represents a coiled compression spring encircling the extended end of the sleeve member 2 and operative between the end of the hub 14 of the master disk 13 and the inner face of the web 23 of the hand wheel 21 in a manner to press the master disk against the adjacent disk of one of the series 9 that frictionally engages the adjacent disk of the series 10, thereby causing all of the disks of each series to frictionally engage in a manner to cause the shaft 1 to rotate with the driving pulley 5.

In assembling the associated parts of the mechanism the pressure adjusting bolt 15 is turned in a direction to draw the hand wheel 21 against the spring 27 until sufficient pressure is brought against the master disk 13 to cause a degree of frictional engagement of the two disks great enough to normally carry the load upon the driving shaft only after it has attained a predetermined rate of speed. The pressure regulating ring 18, thimble 17 and bolt 15, as a unit, are then secured or locked in adjusted position by means of a locking screw 28 carried by the thimble 17 and engaging with the end face of the sleeve 2, and 29 is a supplemental locking screw engaging with the screw 28 in the same tapped hole and which is screwed down on top of the adjusting screw 28 to prevent its being jarred loose when set in the adjusted position.

When power is transmitted to the driving pulley 5 of a cream separator, as by means of a belt 30, it is desirable that the operative parts be gradually brought to a full rate of speed as quickly as possible, and without detrimental shocks or jerks, and for this purpose I have provided means for temporarily increasing the degree of friction caused by the spring pressure mechanism upon the disks. When the hand wheel 21 is turned in a direction to cause the studs 22 to ride inward upon the inclined walls 26, the web of the wheel pressing against the spring 27 increases its force as required, and when the wheel is released it assumes its initial position under pressure of the spring 27, and said spring then carries its normal force against the master disk, which pressure is sufficient to maintain a regulated speed of the operative parts of the machine. Of course, it is understood that the pulley and parts directly associated therewith run at a comparatively low speed, so that it is a simple matter to turn the wheel 21 by hand to temporarily increase the friction between the clutch disks. The driven part or separator assumes its full speed in less than a minute. As is well-known in the cream separator art, there is suitable gearing between the driving shaft and bowl spindle to give a tremendous speed to the bowl for slow movement of the driving shaft.

Having shown and described one embodiment of my invention, I do not wish that it be confined to the specific details of the structure as illustrated, it being understood that many changes may be made in the form and proportion of its various parts without departing from the spirit of my invention as indicated in the appended claims.

What I claim as new, and desire to secure by Letters Patent, is:

1. A multiple disk clutch including, in combination, a driving member, a series of clutch disks operatively connected with said driving member, a driven member, a second series of clutch disks operatively connected with said driven member and opposing said first series in alternate relation, a master disk opposing one of said disks and adapted to press the two series of disks in frictional engagement, a spring carried by the driven member and exerting pressure against said master disk, adjustable means carried by said driven member operable to regulate a normal pressure of said spring, and supplemental pressure regulating means carried by said driven member and operable to initially increase the force of said spring.

2. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a master disk journaled upon said sleeve for engaging with one of said disks in a manner to press the two series in frictional engagement, a compression spring carried by the sleeve and exerting pressure against said master disk, a threaded bolt received by an axial opening in one end of said sleeve, said bolt having a head within said sleeve whereby it may be adjusted longitudinally, a thimble secured to the opposite end of said bolt, and means on said thimble engaging with said spring whereby a longitudinal adjustment of said bolt determines the pressure exerted by said spring against said master disk.

3. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a master disk journaled upon said sleeve for engaging with one of said disks in a manner to press the two series in frictional engagement, a compression spring carried by the sleeve and exerting pressure against said master disk, a threaded bolt in said sleeve operatively connected to said spring, and means for locking said bolt in adjusted position.

4. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a separate master disk journaled upon said sleeve for engaging with one of said disks in a manner to press the two series in frictional engagement, a compression spring carried by the sleeve and exerting pressure against said master disk, a member adjustable in said sleeve and operatively connected to said spring, operable to lock said member in adjusted position.

5. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a separate master disk journaled upon said sleeve for engaging with one of said disks in a manner to press the two series in frictional engagement, a compression spring carried by the sleeve and exerting pressure against said master disk, an adjustable threaded member operatively connected to said spring, and means operable to lock said member in adjusted position.

6. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a master disk journaled upon said sleeve for engaging with one of said disks in a manner to press the two series in frictional engagement, a compression spring carried by the sleeve and exerting pressure against said master disk, a threaded bolt received by an axial opening in said sleeve; said bolt being operatively connected to said spring and having a head within said sleeve whereby it may be adjusted longitudinally, to vary the pressure exerted by the spring, and other means carried by said bolt operable to initially increase the pressure of said spring.

7. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a master disk journaled upon said sleeve for engaging with one of said disks in a manner to press the two series in frictional engagement, a compression spring carried by the sleeve and exerting pressure against said master disk, a threaded bolt received by an axial opening in said sleeve, said bolt being operatively connected to said spring and having a head within said sleeve whereby it may be adjusted longitudinally to vary the pressure of the spring, and other means carried by said bolt operable to initially increase the pressure of said spring, said means including a ring having an axially inclined notch, and a hand wheel having a coacting member received by said notch, said wheel being disposed between said ring and said spring.

8. A multiple disk clutch including, in combination, a driving member, a series of clutch disks operatively connected with said driving member, a driven member including a sleeve having said driving member journaled thereon, a second series of clutch disks operatively connected with said sleeve and opposing said first series in alternate relation, a master disk journaled upon said sleeve for engaging with one of said disks in a manner to press the two series in frictional engagement, a compression spring carried by the sleeve and exerting pressure against said master disk, an adjustable threaded bolt in said sleeve, means whereby upon a longitudinal adjustment of said bolt the pressure exerted by said spring against said master disk is varied, and means whereby the pressure of said spring may be varied independent of movement of said bolt.

9. A multiple disk clutch including, in combination, driving and driven members, means for regulating normal frictional driving pressure therebetween, and other means through the operation of which the initial pressure may be increased.

10. A multiple disk clutch including, in combination, driving and driven members, means for regulating normal frictional driving pressure therebetween, and means through the operation of which pressure may be increased and which permits the initial pressure to return to normal upon being released.

In testimony whereof I affix my signature.

WILLIAM H. F. SMITH.